July 13, 1954 H. B. BRIGGS ET AL 2,683,794

INFRARED ENERGY SOURCE

Filed Dec. 27, 1951 2 Sheets-Sheet 1

INVENTORS: H. B. BRIGGS
J. R. HAYNES
W. SHOCKLEY
BY [signature]
ATTORNEY

July 13, 1954 H. B. BRIGGS ET AL 2,683,794

INFRARED ENERGY SOURCE

Filed Dec. 27, 1951 2 Sheets-Sheet 2

INVENTORS: H. B. BRIGGS
J. R. HAYNES
W. SHOCKLEY

BY [signature]

ATTORNEY

Patented July 13, 1954 2,683,794

UNITED STATES PATENT OFFICE 2,683,794

INFRARED ENERGY SOURCE

Howard B. Briggs and James R. Haynes, Chatham, and William Shockley, Madison, N. J., assignors to Bell Telephone Laboratories, Incorporated, New York, N. Y., a corporation of New York Application December 27, 1951, Serial No. 263,612

10 Claims. (Cl. 219—34)

This invention relates to energy generation and more particularly to methods of and devices for generating infra-red energy.

An object of this invention is to facilitate the generation of readily controllable infra-red energy. More specific objects of this invention are to enable infra-red energy to be generated in narrow frequency band widths, from a limited area source, and in controlled intensities. Another object is to produce usable infra-red energy for signalling, particularly for signalling at high frequencies.

One feature of this invention resides in generating infra-red energy by the recombination of electron-hole pairs in semiconductors.

Another feature resides in creating high rates of electron-hole recombination by injecting foreign charge carriers into a semiconductor body of one conductivity type thereby to bring large numbers of these free charge carriers into a region in which they readily recombine with carriers of the type normally present in that region.

A further feature of this invention resides in utilizing an n-p junction in a semiconductor as a source of infra-red energy of substantially a single frequency.

Before proceeding with a detailed description of the invention the following discussion of some basic principles and theory may aid in understanding and appreciating the specific embodiments described and the possible modifications thereof. Only extrinsic semiconductors will be considered. An extrinsic semiconductor has the characteristic that the conductivity at room temperature is largely due to the presence of impurity atoms. If these are of a type which furnish excess electrons, the impurity atoms are called donors and the semiconductor is known as n-type. Conversely, if the impurity atoms provide electron deficits or holes, the atoms are called acceptors and the semiconductor is known as p-type. If both acceptor and donor impurities are present, the semiconductor will be either n or p-type depending upon the excess of the one impurity over the other and the conductivity so produced is due either to excess electrons or holes but not both. The concentration of excess electrons or holes due to impurities is a constant at any given temperature, depending only on the composition of the semiconductor.

This invention requires the presence of both free electrons and free holes simultaneously in a material so that direct electron-hole recombination will occur to produce radiation. High concentrations of free electrons and free holes are necessary for the production of radiation and, therefore, it is advantageous to use material having a high excess concentration of either donor or acceptor atoms so that the concentration of either holes or excess electrons is high prior to the injection of charge carriers of the opposite type into the material.

Silicon and germanium will be described as exemplary materials for an infra-red generator in accordance with this invention. It is to be understood, however, that the invention is applicable to extrinsic semiconductors generally when proper techniques are employed in their use to obtain sufficiently high rates of direct electron-hole recombination to produce radiation.

The crystalline form of both germanium and silicon is the diamond lattice in which each atom forms four covalent (electron pair) bonds with neighboring atoms. The electrons in these covalent bonds are unable to move in electric fields of ordinary intensity and thus do not contribute to the electrical conductivity of the crystal. It is found, however, that if visible light is allowed to fall on a germanium or silicon crystal some of the valence electrons are ejected from the bonds leaving behind electron deficits, or positive holes. Both the ejected electrons and holes are capable of moving in an electric field so that the conductivity is increased.

As the wavelength of the light used to irradiate the crystal is continuously increased, the incident quanta have progressively less energy in accordance with the equation, $$E=h\nu=hc/\lambda$$

where E is the energy of the light quanta, $h$ is Planck's constant, $\nu$ is the frequency of the light, $\lambda$ the wavelength and $c$ its velocity. A point is finally reached at which the incident quanta have just sufficient energy to break a covalent bond and so produce an electron-hole pair. The corresponding wavelength is known as the internal long wave limit of the crystal. Careful measurements of the increase in conductivity and incident light intensity have shown that one electron-hole pair is produced for each photon of light absorbed for light with quanta having sufficient energy. The minimum energy required to produce an electron-hole pair and thereby increase the number of free charge carriers is that which will transfer an electron having maximum energy in the valence bond band to a condition of minimum energy in the conduction band. This minimum energy has been found to be 1.1 electron volts for silicon and 0.7 electron volts for germanium. Thus, the internal long wave limits for these materials are about 1.2 and 1.8 microns, respectively.

The conductivity which is an index of the number of free charge carriers present can be increased in a semiconductor by the application of forms of external energy other than light energy. The increase in the conductivity of intrinsic semiconductors with temperature is usually due to the breaking of large numbers of valence bonds by thermal energy.

The conductivity of semiconductors can also be increased by carrier injection. This may be done by causing a current to flow from a metal point into an n-type semiconductor or from a p-type semiconductor into a metal point. Large concentrations of injected carriers can be obtained by using a p-n junction with current flowing from the p to the n-type material so that electrons are injected into the p-type semiconductor and holes into the n-type. Since neutralization of space charge requires that each minority carrier be accompanied by an additional carrier of the opposite sign, extremely high densities of excess electrons and holes can be built up in the immediate vicinity of the junction.

Whenever the conductivity of the semiconductor is increased by one of the above means, the sample reverts to its original conductivity when the energy source is removed. Thus, if the voltage applied across the p-n junction is suddenly removed the carrier concentration in the neighborhood of the junction decays to its original value. This restoration of the original conductivity implies some process or processes of recombination of the injected charge carriers and carriers of the opposite sign present in the material.

Conservation of energy demands that the recombination of an electron-hole pair be accompanied by the release of an amount of energy equal to that required to produce a pair. Conceivably this energy may appear either in the form of quanta of thermal lattice vibrations (phonons), or it may be radiated in the form of light quanta (photons), or both. With carrier concentrations ordinarily obtained in semiconductor devices of the prior art only an extremely small fraction of recombination energy could have been of a nature which would appear as characteristic radiation, most of the recombination being produced by "recombination centers" and very little if any through direct electron-hole recombination. Only with extremely high concentrations of free carriers can the chance of direct electron-hole capture be made at all comparable to that of carrier capture through recombination centers so that usable amounts of characteristic radiation result.

Electron-hole concentration rates sufficient to produce usable quantities of substantially single frequency electromagnetic energy can be obtained by injecting charge carriers of one type at high rates into properly prepared and shaped bodies of semiconductor material which normally contain an excess of charge carriers of the opposite type. Thus, electrons can be injected into p-type material, holes can be injected into n-type material or an n-p junction can be utilized by drawing a forward current across it to inject electrons from the n section into the p section and holes from the p section into the n section.

The narrow range of radiation frequencies associated with the energy evolved from the dropping of an electron across the entire forbidden band of the material will be referred to as characteristic radiation as opposed to that form of radiation having a broad emission spectrum, called black body radiation, resulting from thermal agitation at high temperature.

Various means of injecting charge carriers into a semiconductor are known and may be employed to generate characteristic infra-red energy; however, since the recombination rate of holes and electrons is high the means must inject carriers at a high rate. Injection by point contacts, or by forward biased n-p junctions is presently believed to be the best method of generating infra-red energy by the process of electron-hole recombination although other methods of bringing free electrons and holes into a region under conditions suitable for recombination are available, for example by the application of visible light to a semiconductor or by bombardment of the semiconductor with high energy particles such as alpha particles. In the following discussion and claims the term injection is intended to include excitation of minority charge carriers by incident light or bombardment as well as emission of carriers from physical contacts. Minority charge carrier injection rates equivalent to that obtained from an emitter at a current density of at least 10 amperes per square centimeter is sufficient to produce usable infra-red energy.

In a particular embodiment illustrative of the features of this invention, a body of semiconductive material, for example germanium or silicon, having a sufficient predominance of significant impurity in its various portions so that these portions are highly conductive, i. e., of the order of 0.01 to 0.1 $ohm^{-1}$ $centimeter^{-1}$, is provided with one portion which is of strongly n-type material and another portion which is of strongly p-type material. Such an n-p junction can be employed as an excellent emitter of foreign carriers into both the n and p-type portions of the semiconductor body when biased by a current in the forward direction of conduction, i. e., with the p-type material biased positive relative to the n-type material. The resulting recombination produces energy at least a portion of which is infra-red radiant energy of a narrow band width, as will be described more fully hereinafter. By changing the intensity of current through the n-p junction the infra-red output is changed; thus an on-off signal or a signal of modulated intensity is produced depending upon the current levels and the character of the emitter and semiconductive material.

The invention together with its objects and features will be more fully understood from the following description when read in conjunction with the accompanying drawings in which.

Figure 1:
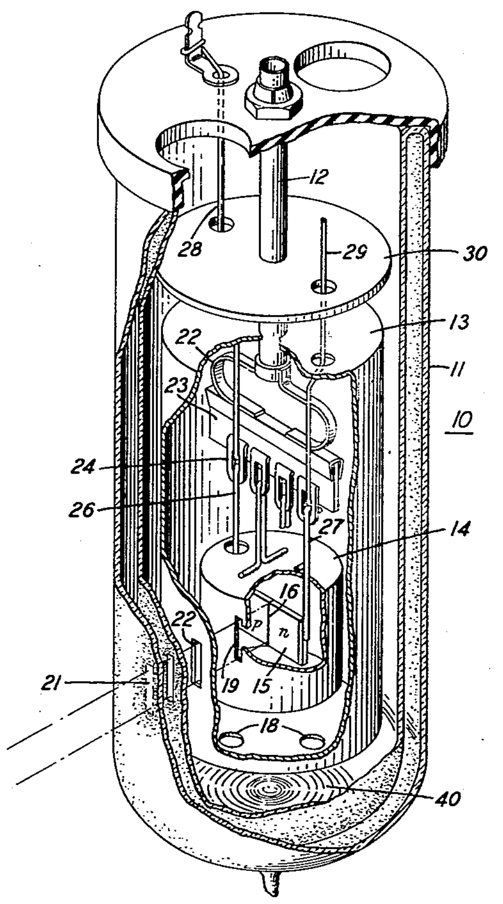
Fig. 1 is a perspective view of one form of semiconductive element suitable for the generation of infra-red energy in accordance with this invention, portions of the structure being broken away to reveal its details.

One form of apparatus used to produce recombination radiation is shown in Fig. 1. This device 10 comprises a Dewar flask 11 which is silvered inside and out to reduce the passage of heat therethrough. Supported within the Dewar flask on a column 12, which may be a Monel metal tube, is a pair of shielding cans 13 and 14 surrounding and protecting a thin slice of semiconductive material 15, which may be of silicon or germanium containing an n-p junction 16. This construction is provided to permit the temperature of the p-n junction to be controlled for the purpose to be described below. The cans surrounding the junction and the disc 30 on column 12 are constructed of copper to provide thermal protection and are provided with suitable apertures 18 so that refrigerant when placed in the Dewar flask can circulate around the semiconductor body 15. Aligned windows 19, 22 and 21 are provided in the inner and outer cans and the Dewar flask, respectively, to permit the radiation resulting from carrier recombination in the region of the p-n junction to pass from the container to the exterior. Structurally the outer can 13 is connected directly to column 12 while a bracket 22 is secured to the end of the column and supports an insulating terminal strip 23 carrying solder lugs 24, two of which support the inner can 14 and two of which support the semiconductor slice by means of leads 26 and 27. The electrical energy is applied to the semiconductor slice 15 by means of leads 28 and 29 which are connected to solder lugs 24 and thence to leads 26 and 27.

Figure 2:
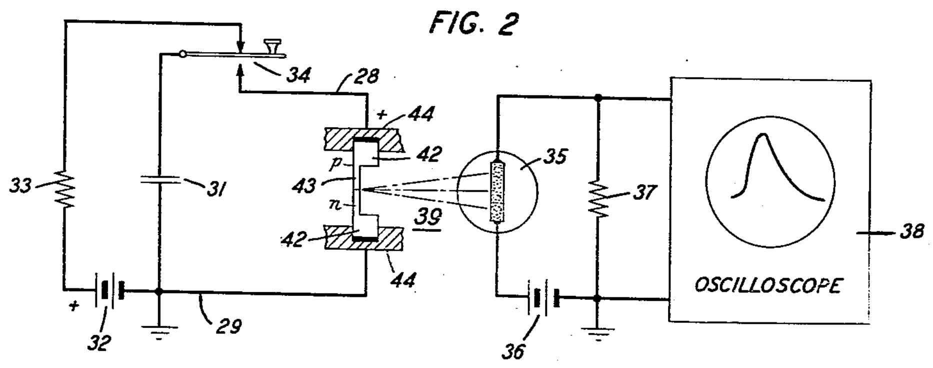
Fig. 2 shows schematically one arrangement for generating infra-red energy together with means for detecting and interpreting the signal received from the device.

One arrangement employed to produce and detect recombination radiation in semiconductors is shown in Fig. 2. A schematic of the circuit used to produce the radiated quanta is shown on the left. It comprises a semiconductor device 39 including a semiconductive body containing a p-n junction connected by means of leads 28 and 29 to a circuit including a condenser 31 arranged to be charged by a battery 32 through a protective resistance 33 or to be discharged through the semiconductor device 39 by a key 34. Thus, when the key is permitted to remain in the upper position a circuit is completed from the battery through the protective resistance to the condenser to charge it and when the key is depressed the battery is disconnected and the condenser discharges through the device 39. The polarity of charging current is such that current flows across the junction from the p to the n side, i. e., in the forward direction. Under these conditions large concentrations of excess electrons and holes are built up in the immediate vicinity of the p-n junction and high rates of recombination occur in that region.

A circuit for detecting the radiation resulting from recombination of carriers in the device 39 is shown on the right in Fig. 2. This circuit may comprise a suitable detector 35, such as a lead sulphide photoelectric cell, connected in series with a battery 36 and a high resistance 37. A trace of the detected energy is obtained on oscilloscope 38 by connecting its vertical deflecting plates across resistance 37 so that the voltage applied to these plates is proportional to the radiated energy falling on the photoelectric cell. The oscilloscope is synchronized to the time of closing the key 34 and the start of the condenser discharge.

When the condenser is discharged across the p-n junction, an oscillogram such as that shown in Fig. 2 is obtained. It consists of a rapid rise reaching a maximum in about 100 microseconds followed by a slow decay having a time constant of about 200 microseconds. As evidence that the trace obtained was produced by radiation emanating from the p-n junction, an opaque screen was positioned between the junction and the lead sulphide cell and the condenser was discharged through the junction with no indication being produced on the oscilloscope.

Figure 3:
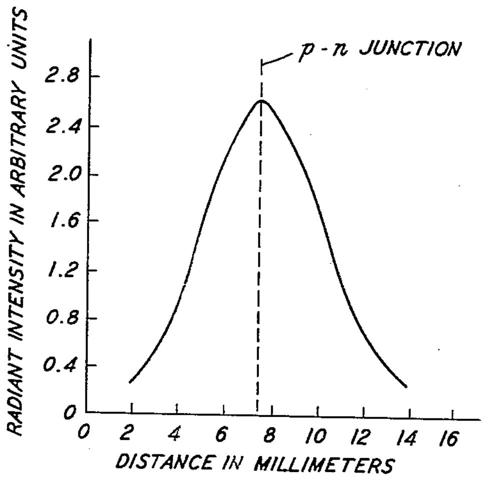
Fig. 3 is a plot of the intensity of radiation from a device utilizing a forward biased n-p junction of germanium as an emitter as a function of distance along the specimen.

Measurements of radiation intensity as a function of distance on either side of the junction have been made by placing a narrow slit intermediate the detector and the p-n junction. The results of these measurements from a single crystal germanium source having a carrier lifetime of less than 10 microseconds and resistivities of the order of 0.01 to 0.1 ohm centimeters on both sides of the junction and having an 18-microfarad condenser charged to 45–270 volts discharged therethrough are plotted in Fig. 3. The peak current densities across the junction in this arrangement were about 1000 amperes per square centimeter. This plot shows that the intensity of emitted radiation rises to a maximum at the p-n junction and falls nearly symmetrically on either side, thus showing the injected electrons and holes are equally effective in the production of radiation. In the specimens reported on the radiation intensity is shown to be more than one-half maximum at a distance of 2 millimeters on either side of the junction. The amount of this spread of the source of radiation, however, varies widely between specimens since the distance which the injected carriers are displaced before recombination depends on sample conductivities and the lifetimes of injected carriers as well as the current. In samples which are more highly doped, i. e., contain more acceptor and donor impurities and, therefore, have higher conductivities, the spread in the source of radiation is less than that shown in Fig. 3.

From the theory of electromagnetic wave generation set forth above, it is to be expected that the characteristic recombination in a semiconductor would occur across a fixed energy gap $E_g$ and a sharp and definite wavelength of energy would result. The wavelengths of the energy obtained from characteristic recombination in actual semiconductor samples, as plotted in Fig. 4, extend over a range which may be as wide as a few tenths of a micron. This apparent anomaly resulting from a lack of a sharp characteristic wavelength may be partly due to the kinetic energy of the holes and electrons and partly to variations in the energy gap $E_g$ of the material largely produced by thermal vibration of the crystal lattice.

Figure 4:
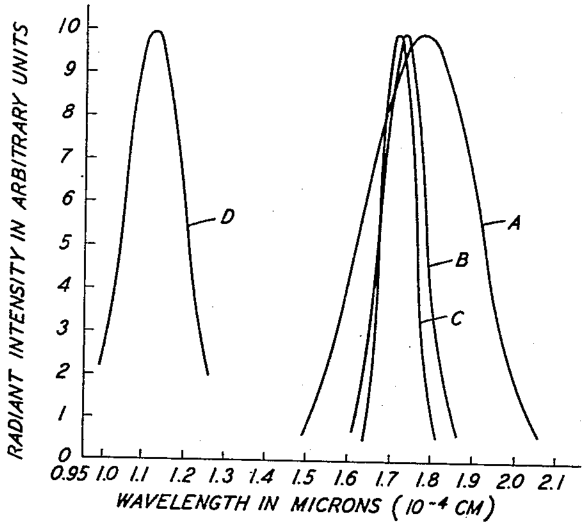
Fig. 4 is a normalized plot of the wavelengths of the radiated energy from germanium and silicon against its relative intensities at those wavelengths.

In making the wavelength analyses plotted in Fig. 4, a monochromator equipped with a fluorite prism was provided with slits through which the infra-red light quanta from p-n junctions passed to fall on a lead sulphide cell detector coupled with the oscilloscope as shown in Fig. 2. The maximum deflection of the oscilloscope which is proportional to the radiation intensity reaching the lead sulphide cell was measured as a function of wavelength. The lead sulphide cell has a near constant response over the wavelength range used. The radiation intensity for individual curves has been normalized.

It will be seen from Fig. 4 that the radiation intensity does not have the broad wavelength distribution characteristic of a black body but is sharply peaked. Curve A which is a plot of the radiation received from a germanium p-n junction maintained at room temperature, at 295° K., is sharply peaked at a wavelength of 1.78 microns which corresponds to an energy of 0.69 electron volts. This peak value is quite close to the best estimates of the energy required to break a covalent bond and so produce an electron hole pair in germanium. There is a distribution of wavelengths on either side of the maximum so that the characteristic has a half-width of 0.313 micron. The finite width of the monochromator slit is responsible for a half-width of 0.064 micron. The characteristic due to the radiation itself therefore has a half-width of 0.25 micron or 0.10 electron volts. This spread of wavelength (variation in energy of recombination of electron hole pairs) may be ascribed partly to the distribution of the kinetic energy of the holes and electrons but it is believed that it is largely associated with the variations in the width of the energy gap $E_g$ resulting from local vibrations of germanium atoms. Since these vibrations are attributable to thermal effects, it is to be expected that the half-width of the characteristic would decrease with the temperature of the sample. Such is the case as disclosed by curves B and C. Curve B was obtained by cooling the sample employed for curve A to 77.4° K. or the temperature of liquid nitrogen and curve C is for the same sample cooled to 21.5° K. by liquid hydrogen. The samples are cooled by placing refrigerant 40 in the bottom of the Dewar flask 11 and allowing it to circulate through the apertures 18 and around the semiconductor slice 15.

It was found that the radiation intensity increased as the sample was cooled so that about five times as many quanta were radiated at the temperature of liquid air as at room temperature. It is, therefore, evident that a much greater proportion of the recombination energy is radiated at these low temperatures than at room temperature and that, therefore, the device is much more efficient when cooled. It may also be observed that the characteristics became sharper as the temperature of the germanium sample was decreased. This agrees with the simple theory outlined above. It is to be noted that at these low temperature measurements the monochromator slit was reduced to an extent that the appropriate slit width correction to the half-width of the characteristic is 0.050 micron. The half-width at the temperature of liquid nitrogen is 0.025 electron volts and at the temperature of liquid hydrogen it is 0.016 electron volts. It may also be seen from these plots that there is also a shift in the peak energy towards shorter wavelengths with decreasing temperature.

Radiation due to direct recombination of excess electrons and holes has also been produced and detected by using a silicon p-n junction instead of germanium in the simple circuit shown in Fig. 2.

The wavelength of the quanta radiated from silicon was analyzed with the same monochromator arrangement used for germanium. The results at room temperature are shown on curve D in Fig. 4, in which radiant energy is plotted as a function of wavelength as before. The wavelength of the maximum radiated energy is very close to 1.12 microns corresponding to 1.10 e. v. This agrees well with the accepted value of the energy gap in silicon (1.11 e. v.) determined from measurements of conductivity as a function of temperature.

Various expedients are available in the art to produce units which will generate usable infra-red by electron-hole recombination when the criteria for such generation are set forth. The preceding discussion indicates that the infra-red output is dependent upon the rate of direct recombination, which is proportional to the product of hole density and electron density. High densities of majority charge carriers can be provided for in the semiconductive material by the addition of significant impurities to the material by known techniques. Large quantities of minority charge carriers can be injected into the semiconductor by employing point contact or junction emitters and by passing current of from 10 amperes per square centimeter to at least 1000 amperes per square centimeter, currents which compared to those employed in previous semiconductor translators would be considered excessive. The physical arrangement of the unit should be such that the temperature rise due to these high current densities is kept to a minimum, for example by cooling or by mounting the unit in intimate heat transfer relationship with a body having a large thermal capacity. In this regard one suitable construction is to form a semiconductive body containing an n-p junction as shown in Fig. 2 with massive ends 42 to which ohmic contacts are made and providing it with a thin intermediate section 43 having a large ratio of radiating surface to total volume. The p-n junction in section 43 should be centrally located and the lengths of section from the junction to the masses 42 should be comparable to the drift length of the carriers, i. e., that length through which half the injected carriers recombine, to provide effective heat conduction to the heat sinks 44 contacting the masses 42.

Recapitulating, it has been discovered that usable infra-red energy of narrow frequency band can be produced by electron hole recombination across the forbidden band in semiconductors. This energy can be induced by passing suitable electrical currents through properly prepared semiconductors. It is advantageous in the operation of semiconductors as infra-red sources that carrier injection concentration be high, that recombination occur near the surface of the semiconductor and that it be across the entire energy gap. These desiderata are obtained by employing good emitters; employing semiconductive material having high concentrations of majority carriers; employing semiconductive bodies formed so that a large portion of the recombination occurs near the surface, for example in a thin slice; and maintaining the unit as cool as practicable. Devices of this nature have exhibited photon efficiencies based on the radiated quanta which succeed in getting out of the sample and the number of electron hole pairs of at least $2\times10^{-6}$, they operate with usable outputs at frequencies having pulse lengths of the order of 10 microseconds, and they have an essentially infinite life.

It is to be understood that the above-described arrangements are illustrative of the application of the principles of the invention. Numerous other arrangements may be devised by those skilled in the art without departing from the spirit and scope of the invention.

What is claimed is:

1. A source of infra-red energy of a narrow band width comprising a semiconductive body, regions of opposite conductivity type in said body, a transition region between said first regions, a contact to a region of each conductivity type, and means for drawing current across said transition region at a density of at least 10 amperes per square centimeter.

2. A source of infra-red energy of a narrow band width comprising a semiconductive body, regions of opposite conductivity type in said body, a transition region between said regions, contact to a region of each conductivity type, means for reducing the operating temperature of said conductive body below ambient, and means for drawing current across said transition region at a density of at least 10 amperes per square centimeter.

3. A source of infra-red energy of about 1.8 microns wavelength comprising a germanium body, regions of opposite conductivity type in said body, a transition region between said regions, a contact to a region of each conductivity type, and means for drawing current across said transition region at a density of at least 10 amperes per square centimeter.

4. A source of infra-red energy of a wavelength of about 1.2 microns comprising a silicon body, regions of opposite conductivity type in said body, a transition region between said regions, a contact to a region of each conductivity type, and means for drawing current across said transition region at a density of at least 10 amperes per square centimeter.

5. A device for generating infra-red energy by the process of electron-hole recombination across a fixed energy gap which comprises a housing, a portion of the wall of said housing being transparent to the generated infra-red waves, a semiconductive body containing an n-p junction within said housing, said junction being in register with said transparent portion, means for cooling said body to about 80° K., and ohmic contacts to said semiconductive body on each side of said junction.

6. A device for generating infra-red energy by the process of electron-hole recombination across a fixed energy gap comprising a housing having walls of low transverse thermal conductivity, a portion of a wall of said housing being transparent to the generated infra-red waves, a semiconductive body containing an n-p junction within said housing, said junction being in register with said transparent portion, ohmic contacts to said semi-conductive body on each side of said junction and refrigerating means associated with said housing.

7. A source of infra-red energy comprising a semiconductive body, massive portions on said body, a portion of reduced cross section intermediate said massive portions, said reduced portion having a cross section with a major dimension substantially greater than its minor dimension, an n-p junction positioned transverse said portion of reduced cross section, said junction being so located and said reduced portion being of such length that said junction is spaced from each of said massive portions a distance comparable to the drift length of said material under operating conditions with current densities of at least 10 amperes per square centimeters, an element having a large thermal capacity in intimate heat transfer relationship with each of said massive portions, ohmic contacts to each massive portion, and means to apply a current density of at least 10 amperes per square centimeter through said n-p junction in the forward direction.

8. The method of generating infra-red energy in a narrow band width that comprises passing a current of at least 10 amperes per square centimeter across a semiconductive n-p junction in the forward direction of conduction.

9. The method of generating infra-red energy of about 1.8 microns wavelength that comprises passing a current of at least 10 amperes per square centimeter across an n-p junction of germanium in the forward direction of conduction.

10. The method of generating infra-red energy of about 1.2 microns wavelength that comprises passing a current of at least 10 amperes per square centimeter across an n-p junction of silicon in the forward direction of conduction.

References Cited in the file of this patent

UNITED STATES PATENTS

| Number | Name | Date |
|---|---|---|
| 788,493 | Parker | Apr. 25, 1905 |
| 2,502,488 | Shockley | Apr. 4, 1950 |
| 2,569,347 | Shockley | Sept. 25, 1951 |